(12) United States Patent
Daimer

(10) Patent No.: US 7,794,519 B2
(45) Date of Patent: *Sep. 14, 2010

(54) GRAPHITE ELECTRODE FOR ELECTROTHERMIC REDUCTION FURNACES, ELECTRODE COLUMN, AND METHOD OF PRODUCING GRAPHITE ELECTRODES

(75) Inventor: Johann Daimer, Mörfelden-Walldorf (DE)

(73) Assignee: SGL Carbon SE, Wiesbaden (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/206,356

(22) Filed: Sep. 8, 2008

(65) Prior Publication Data

US 2009/0000425 A1 Jan. 1, 2009

Related U.S. Application Data

(63) Continuation of application No. 11/123,768, filed on May 5, 2005, now abandoned.

(60) Provisional application No. 60/570,984, filed on May 12, 2004.

(51) Int. Cl.
C22B 4/00 (2006.01)
(52) U.S. Cl. .................. 75/10.62; 75/10.65; 201/5; 264/105
(58) Field of Classification Search ............ 264/105; 75/10.65, 10.62; 201/5
See application file for complete search history.

(56) References Cited

U.S. PATENT DOCUMENTS

| | | | |
|---|---|---|---|
| 1,440,724 A | 1/1923 | Söderberg | |
| 1,441,037 A | 1/1923 | Söderberg | |
| 2,678,205 A * | 5/1954 | Buhler et al. .................. 432/7 |
| 2,974,032 A | 3/1961 | Grunert et al. | |
| 3,451,921 A * | 6/1969 | Milton ........................ 208/131 |
| 3,607,221 A | 9/1971 | Kibby | |
| 4,096,097 A | 6/1978 | Yan | |
| 4,099,959 A | 7/1978 | Dewing et al. | |
| 4,486,229 A | 12/1984 | Troup et al. | |
| 4,491,472 A | 1/1985 | Stevenson et al. | |
| 4,575,856 A | 3/1986 | Persson | |
| 4,998,709 A * | 3/1991 | Griffin et al. ................ 264/29.5 |
| 6,440,193 B1 | 8/2002 | Johansen et al. | |
| 6,635,198 B1 | 10/2003 | Vatland et al. | |
| 7,544,316 B2 * | 6/2009 | Kortovich et al. ........... 264/29.1 |
| 2005/0254545 A1 | 11/2005 | Daimer | |

FOREIGN PATENT DOCUMENTS

JP 2001187888 A * 7/2001

OTHER PUBLICATIONS

Ellis, Paul J.: "Tutorial Delayed Coking Fundamentals". 3rd International Conference on Refining Processes, 1998, pp. 47-64.
Predel, Heinrich, MiRO GmbH & Co. KG: "Petroleum Coke", 1998, pp. Ullman's Encyclopedia of Industrial Chemistry, 6th Edition, 7 pages.
Marsh, H. et al.: "Delayed Coking: Practice and Theory", Introduction to Carbon Technologies, Chapter 10, 1997, pp. 491-497.
Bruno, Marshall J.: "Aluminum Carbothermic Technology Comparison to Hall-Heroult Process", Light Metals 2003, pp. 395-400.
Johansen, Kai et al.: "Aluminum Carbothermic Technology Alcoa-Elkem Advanced Reactor Process". Light Metals 2003, pp. 401-406.
Gerogiorgis, Dimitrios I. et al.: "A Finite Element Computational Fluid Dynamics Sensitivity Analysis for the Conceptual Design of a Carbothermic Aluminum Reactor", Light Metals 2003, pp. 407-414.

* cited by examiner

*Primary Examiner*—Roy King
*Assistant Examiner*—Tima M McGuthry-Banks
(74) *Attorney, Agent, or Firm*—Laurence A. Greenberg; Werner H. Stemer; Ralph E. Locher

(57) ABSTRACT

A graphite electrode for an electrothermic reduction furnace is formed from anode grade coke and graphitized at a graphitization temperature below 2700° C. The resulting electrode is particularly suited for carbothermal reduction of alumina. It has an iron content of about 0.05% by weight, a specific electrical resistivity of above 5 μOhm·m, and a thermal conductivity of less than 150 W/m·K. The graphite electrode is manufactured by first mixing calcined anode coke with a coal-tar pitch binder, and a green electrode is formed from the mixture at a temperature close to the softening point of the pitch binder. The green electrode is then baked to carbonize the pitch binder to solid coke. The resultant carbonized electrode, after further optional processing is then graphitized at a temperature below 2700° C. for a time sufficient to cause the carbon atoms in the carbonized electrode to organize into the crystalline structure of graphite.

22 Claims, No Drawings

GRAPHITE ELECTRODE FOR ELECTROTHERMIC REDUCTION FURNACES, ELECTRODE COLUMN, AND METHOD OF PRODUCING GRAPHITE ELECTRODES

CROSS-REFERENCE TO RELATED APPLICATION

This application is a continuation of, and claims priority from, U.S. patent application Ser. No. 11/123,768, filed on May 5, 2005 now abandoned, which claims priority from U.S. Provisional Application No. 60/570,984, filed May 12, 2004.

BACKGROUND OF THE INVENTION

1. Field of the Invention

The present invention relates to graphite electrodes for electrothermic reduction furnaces, in particular for the production of aluminum, titanium, silicon, ferroalloys, phosphorous. The invention also pertains to a method of producing such graphite electrodes.

2. Description of the Related Art

For a century the aluminum industry has relied on the Hall-Heroult process for aluminum smelting. In comparison with processes used to produce competing materials, such as steel and plastics, the process is energy-intensive and costly. Hence, alternative aluminum production processes have been sought.

One such alternative is the process referred to as direct carbothermic reduction of alumina. As described in U.S. Pat. No. 2,974,032 (Grunert et al.) the process, which can be summarized with the overall reaction $$Al_2O_3 + 3C = 2Al + 3CO \quad (1)$$

takes place, or can be made to take place, in two steps:

$$2Al_2O_3 + 9C = Al_4C_3 + 6CO \quad (2)$$

$$Al_4C_3 + Al_2O_3 = 6Al + 3CO \quad (3).$$

Reaction (2) takes place at temperatures between 1900 and 2000° C. The actual aluminum producing reaction (3) takes place at temperatures of 2200° C. and above; the reaction rate increases with increasing temperature. In addition to the species stated in reactions (2) and (3), volatile Al species including $Al_2O$ are formed in reactions (2) and (3) and are carried away with the off gas. Unless recovered, these volatile species represent a loss in the yield of aluminum. Both reactions (2) and (3) are endothermic.

Various attempts have been made to develop efficient production technology for the direct carbothermic reduction of alumina (cf. Marshall Bruno, Light Metals 2003, TMS (The Minerals, Metals & Materials Society) 2003). U.S. Pat. No. 3,607,221 (Kibby) describes a process in which all products quickly vaporize to essentially only gaseous aluminum and CO, containing the vaporous mixture with a layer of liquid aluminum at a temperature sufficiently low that the vapor pressure of the liquid aluminum is less than the partial pressure of the aluminum vapor in contact with it and sufficiently high to prevent the reaction of carbon monoxide and aluminum and recovering the substantially pure aluminum.

Other patents relating to carbothermic reduction to produce aluminum include U.S. Pat. Nos. 4,486,229 (Troup et al.) and 4,491,472 (Stevenson et al.). Dual reaction zones are described in U.S. Pat. No. 4,099,959 (Dewing et al.). More recent efforts by Alcoa and Elkem led to a novel two-compartment reactor design as described in U.S. Pat. No. 6,440,193 (Johansen et al.).

In the two-compartment reactor, reaction (2) is substantially confined to a low-temperature compartment. The molten bath of $Al_4C_3$ and $Al_2O_3$ flows under an underflow partition wall into a high-temperature compartment, where reaction (3) takes place. The thus generated aluminum forms a layer on the top of a molten slag layer and is tapped from the high-temperature compartment. The off-gases from the low-temperature compartment and from the high-temperature compartment, which contain Al vapor and volatile $Al_2O$ are reacted in a separate vapor recovery units to form $Al_4C_3$, which is re-injected into the low-temperature compartment. The energy necessary to maintain the temperature in the low-temperature compartment can be provided by way of high intensity resistance heating such as through graphite electrodes submerged into the molten bath. Similarly, the energy necessary to maintain the temperature in the high-temperature compartment can be provided by a plurality of pairs of electrodes substantially horizontally arranged in the sidewalls of that compartment of the reaction vessel.

With the exception of aluminum production, electrothermic reduction of various metals and also non-metals, such as titanium, silicon, ferroalloys, as well as phosphorous, are well-established industrial processes. Due to the relatively low current densities, ranging from 6 to 10 $A/cm^2$, in many of these processes self-baking carbon electrodes (also called "Söderberg electrodes") are being used.

The use of self-baking carbon electrodes has been known for a long time (see U.S. Pat. Nos. 1,440,724 and 1,441,037 to Söderberg). Self-baking carbon electrodes basically consist of a pasty mixture of carbon-containing material such as anthracite, coke, tar, and pitch, which is filled into a metal casing held in position within an electric arc furnace by way of contact shoes and a suspension/sliding device. The application of high electric currents plus the heat of the arc struck by the electrode during the furnace operation develops sufficient heat to melt the material filled into the casing and form a paste, then cokify the so-formed paste, and finally bake the electrode. In accordance with its consumption rate the electrode is lowered stepwise, a new casing sheet is joined to the upper part, the casing is filled with the mixture, and the middle section is baked. In a variation, the electrode may be partly baked at a low temperature of about 600° to 700° C. In the context of the Söderberg electrode, the lower part of the steel casing dissolves in the bath of molten metal, thus injecting iron into the bath. To avoid this contamination by iron, several solutions have been proposed, which all consist of mechanically detaching the electrode and the steel casing so that the electrode can be caused to slide without the steel casing.

U.S. Pat. No. 6,635,198 (Vatland et al.) describes a method for the continuous production of self-baking composite electrodes utilizing sectioned metallic casings. Each new section of casing is mounted upon the section of casing below without applying welding or other means to rigidly affix the section to each other. As the sections of casing are not rigidly affixed to each other by welding or the like, it is easy to remove the casing after the electrode has been baked.

Another solution is a mounting configuration as described in U.S. Pat. No. 4,575,856 (Persson) which involves supporting the weight of the electrode by means of a column formed from pre-baked carbon or graphite electrodes being enclosed by the baked paste, both the column and the paste being consumed at the same time.

Modern electric arc furnaces for steel production are operated at current densities in excess of 25 A/cm² and thus require highly conductive graphite electrodes. To achieve electrical resistivities below 10 µOhm m, such graphite electrodes are produced using well-ordered needle cokes and they are graphitized at temperatures above 3000° C. The use of costly needle coke and the high electricity costs for graphitization bar such electrodes from being used in low-power electric furnaces that are used for producing non-steel materials. Furthermore, iron oxides are added to the electrode raw material mixture to inhibit puffing (caused by the release of sulfur from its bond with carbon inside the coke particles). Hence, the increased iron content can contaminate the melt and cause high electrode erosion in melt furnace atmospheres that are rich in CO, such as in the case of carbothermic reduction of alumina.

SUMMARY OF THE INVENTION

It is accordingly an object of the invention to provide a graphite electrode for electrothermic reduction furnaces, in particular for the production of aluminum, titanium, silicon, ferroalloys, and phosphorous, as well as a production method for such electrodes and electrode columns, which overcome the above-mentioned disadvantages of the heretofore-known devices and methods of this general type and which provide for graphite electrodes that do not contaminate the melt with iron, which can be used in melt furnace atmospheres that are rich in CO, and which are economical to produce.

With the foregoing and other objects in view there is provided, in accordance with the invention, a graphite electrode for an electrothermic reduction furnace comprising a shaped graphite electrode body formed from anode grade coke, graphitized at a graphitization temperature below 2700° C., and having an iron content of less than 0.1% by weight, and preferably about 0.05% by weight.

In accordance with an added feature of the invention, the electrode has a specific electrical resistivity of above 5 µOhm·m and a thermal conductivity of less than 150 W/m·K.

The graphite electrode is particularly suited for an electrothermic reduction furnace for producing aluminum, titanium, silicon, ferroalloys, or phosphorous. Specific emphasis is placed on the direct carbothermal reduction of alumina.

In accordance with an additional feature of the invention, an amount of carbon nanofibers and/or carbon fibers is incorporated in the electrode body for increasing a mechanical strength and adjusting a coefficient of thermal expansion thereof.

In accordance with another feature of the invention, the anode grade coke has a mean particle size of approximately 5 to 10 mm, and preferably between 5 and 7 mm.

An intermediate product in the production of the graphite electrode comprising particles of anode grade coke having a mean particle size of between 5 and 10 mm and an ash content of less than 0.5% mixed with a coal tar pitch binder and formed into a green electrode to be baked and graphitized to form the graphite electrode.

With the above and other objects in view there is also provided, in accordance with the invention, a graphite pin formed of anode grade coke, graphitized at a graphitization temperature below 2700° C., having an iron content of less than 0.1% by weight. The graphite pin is formed to mate with the graphite electrode body to form an electrode column.

In accordance with a further feature of the invention, the above-summarized graphite electrode is disposed to form a central column of a self-baking composite electrode in an electrothermic reduction furnace.

With the above and other objects in view there is also provided, in accordance with the invention, a method of producing a graphite electrode. The method comprises the following method steps:

providing calcined anode coke with an average particle size of 5 to 10 mm and mixing the anode coke with a coal-tar pitch binder to form a mixture;

forming an electrode body from the mixture to form a green electrode at a temperature in a vicinity of a softening point of the pitch binder;

baking the green electrode at a temperature of between approximately 700° C. and approximately 1100° C., to carbonize the pitch binder to solid coke, to form a carbonized electrode;

graphitizing the carbonized electrode with a heat treatment at a final temperature between 2100° C. to 2700° C. for a time sufficient to cause carbon atoms in the carbonized electrode to organize into a crystalline structure of graphite.

Preferably, the graphitization temperature is between 2200° C. to 2500° C. and the green electrode is bake at a temperature between 800° C. and 1000° C. It is further preferred to bake the green electrode in a relative absence of air at a heating rate of approximately 1 K to approximately 5 K per hour to the final temperature.

In accordance with again an added feature of the invention, the electrode may be impregnating at least one time with coal tar or petroleum pitch after baking. This deposits additional pitch coke in open pores of the electrode. Ech impregnating step is followed with an additional baking step.

The green electrode may be formed by extrusion. In that case, it is advantageous to add to the mixture oils or other lubricants to aid in the extrusion throughput. Alternatively, the green electrode may be formed by molding in a conventional forming mold or by vibromolding in an agitated mold.

In accordance with again an additional feature of the invention, the graphitized electrode formed in the graphitizing step is machined to provide a final form of the graphite electrode.

In accordance with a concomitant feature of the invention, a plurality of graphite electrodes as outline are formed, one or more nipples are formed substantially in the same process sequence and such that the nipples and the electrodes can mesh, and the electrodes and a nipple are connected to form a graphite electrode column.

In sum, the invention provides for graphite electrodes for electrothermic reduction furnaces, in particular for the production of aluminum, titanium, silicon, ferroalloys as well as phosphorous. The electrodes are produced using anode grade coke and graphitization temperatures below 2700° C.

The invention also provides for the utilization of graphite pins to be mated with the above-summarized graphite electrodes to form electrode columns. The pins are preferably produced in the same manner as the electrodes of this invention. In this way, the pins (also referred to as nipples) have the same characteristics, such as CTE and mechanical properties, as the electrodes.

The novel electrodes lend themselves very favorably in their utilization as central columns for self-baking composite electrodes for electrothermic reduction furnaces.

Other features which are considered as characteristic for the invention are set forth in the appended claims.

Although the invention is illustrated and described herein as embodied in a graphite electrode for electrothermic reduction and a production method, it is nevertheless not intended to be limited to the details shown, since various modifications and structural changes may be made therein without departing from the spirit of the invention and within the scope and range of equivalents of the claims.

DETAILED DESCRIPTION OF A BEST MODE EXEMPLARY EMBODIMENT

The construction of the invention, however, together with additional objects and advantages thereof will be best understood from the following description of the specific examples and embodiments of the invention.

The first step in the production of graphite electrodes comprises combining calcined coke and pitch. As noted above, graphite electrodes for steel production are produced using well-ordered needle cokes that are characterized by a coefficient of thermal expansion (CTE) of $0.3-1.0 \times 10^{-6}$ $K^{-1}$, anisotropy of thermal expansion of 1.8, and they possess a coarse fibrous microstructure. According to this invention, the graphite electrodes for electrothermic reduction furnaces are produced using anode coke. Anode cokes have a CTE above $1.2 \times 10^{-6}$ $K^{-1}$, an anisotropy of thermal expansion of 1.5 and a mosaic microstructure. These cokes are very pure. They have an ash content of less than 0.3%. They are readily available at a significantly lower cost than needle cokes and they are used in large quantities for the production of carbon anodes for the Hall-Heroult aluminum smelting process.

The crushed, sized and milled calcined anode coke is mixed with a coal-tar pitch. The particle size of the calcined coke is selected according to the end use of the electrode. Generally, in graphite electrodes for use in processing steel, particles up to about 25 millimeters (mm) in average diameter are employed in the blend. For the graphite electrodes of this invention, an average particle size of 5 to 10 mm, more preferably of 5 to 7 mm, is appropriate. Other ingredients that may be incorporated into the blend at low levels include carbon nanofibers or carbon fibers to provide additional mechanical strength or to adjust the CTE of the final electrode as well as oils or other lubricants to facilitate extrusion of the blend.

After mixing calcined coke and pitch binder, the electrode body is formed (or shaped) either by extrusion though a die or molded in conventional forming molds or vibromolded in agitated molds to form a so-called green electrode. The forming step is conducted at a temperature close to the softening point of the pitch, which is usually about 100° C. or higher. Although the die or mold can form the electrode in substantially final form and size, machining of the finished electrode is usually needed, at the very least to provide threads or other recesses, which may be required to mate with a pin or nipple to from an electrode column. The circumference of the graphite electrodes of this invention may be rectangular or circular.

The green electrode is then baked at a temperature of between about 700° C. and about 1100° C., more preferably between about 800° C. and about 1000° C., to carbonize the pitch binder to solid coke, to give the electrode permanency of form, high mechanical strength, good thermal conductivity, and comparatively low electrical resistance. The baking step is carried out in the relative absence of air at a heating rate of about 1 K to about 5 K per hour to the final temperature. After baking, the electrode may be impregnated one or more times with coal tar or petroleum pitch, or other types of pitches known in the industry, to deposit additional pitch coke in any open pores of the electrode. Each impregnation is then followed by an additional baking step. Preferably the electrode is only impregnated one time with such pitch.

After baking, the electrode—referred to at this stage as a carbonized electrode—is then graphitized by heat treatment at a final temperature between 2100° C. to 2700° C., more preferably between 2200° C. to 2500° C., for a time sufficient to cause the carbon atoms in the calcined coke and pitch coke binder to transform from a poorly ordered state into the crystalline structure of graphite. Because of the purity of the anode coke, the comparably low graphitization temperatures are sufficient to reach the required final electrode ash contents. In the case of graphite electrodes for steel production, graphitization is performed at a temperature of between about 2700° C. and about 3200° C. At these high-temperatures, all elements other than carbon are volatilized and escape as vapors. The time required for maintenance at the graphitization temperature is no more than about 12 hours, preferably about 30 min to about 3 hours. Graphitization can be performed in Acheson furnaces or in lengthwise graphitization (LWG) furnaces, the latter can also be operated in a continuous mode. After graphitization is completed, the finished electrode can be cut to size and then machined or otherwise formed into its final configuration.

The finished electrodes can be mounted in electrothermic reduction furnaces as single-piece electrodes, as electrode bundles, or they can be continuously supplied as electrode columns joined by graphite pins.

In the latter case, the electrode has typically an internal section that is axially tapered from an end to a lengthwise middle portion to receive a graphite pin, and then threads are machined into the tapered portion of the electrode, to permit mating with corresponding threads of the pin, to form the electrode column. Given its nature, the graphite permits machining to a high degree of tolerance, thus permitting a strong connection between the pin and the electrode.

The graphite pins used to join electrode columns can be substantially the same pins as used for electrode columns for steel production or, more preferably, are produced in the same manner as the graphite electrodes of this invention. In the latter case, the pins would have similar properties to the electrodes which is advantageous for preventing cracking of the electrode column due to uneven thermal expansion of electrodes and pins. However, the pins have to resist heavier mechanical load than the electrodes. To achieve the required mechanical properties, yet to have thermal expansion behavior matching that of the electrodes, typically the raw material mixture of the pins is somewhat altered while the processing sequence remains the same as described for the electrodes.

Further, the electrodes and pins can be equipped with means to prevent loosening of the electrode column during operation, such as holes or recesses containing binder pitch or other means.

An additional embodiment of this invention is the utilization of graphite electrodes as described above as central columns for self-baking composite electrodes for electrothermic reduction furnaces. As described in U.S. Pat. No. 4,575,856 (Persson), in order to avoid iron contamination, Söderberg-type electrodes can be produced as composite electrodes consisting of a carbon or graphite electrode core column embedded in Söderberg paste. Using conventional graphite electrodes for steel-manufacturing would, however, increase costs as well as iron contamination. Furthermore, it was determined that the nature of the bond between the graphite and the paste baked into the graphite consist of interpenetration of the paste at their surface of contact. Conventional graphite electrodes for steel-manufacturing typically have low open porosity at about 15% or below. Hence, the surface contact with the Söderberg paste would be limited.

In contrast, graphite electrodes produced as described above provide an economic way to manufacture such self-baking composite electrodes for electrothermic reduction furnaces having low iron content and having an intimate surface contact between the graphite core column and the Söderberg paste.

A further object of this invention is to provide a process to manufacture anode grade coke-based electrodes for electrothermic reduction furnaces using a self-baking carbon electrode manufacturing sequence followed by graphitization at temperatures below 2700° C.

As described above, conventional self-baking electrodes comprise a vertically disposed cylindrical metal casing which extends downwardly through an opening in the roof of an electrothermic reduction furnace. The upper end of the casing is open to permit the insertion of a carbonaceous paste-like material which first melts and then cures to a solid state as it passes downwardly through the casing as a result of heat which is conducted upwardly from the cured portion of the electrode extending below the lower end of the casing. Such paste may be made, for example, by calcining anthracite or petroleum or asphalt cokes which is then mixed with a bonding material such as pitch or tar.

According to this embodiment of the invention, in a first step, a self-baking carbon electrode is produced in a similar manner by using a paste composed of calcined anode grade coke and pitch. Instead of feeding the electrode directly into the electrothermic reduction furnace, it is, if necessary, detached from its metal casing and graphitized at a final temperature between 2100° C. to 2700° C., more preferably between 2200° C. to 2500° C. The graphitization step can be carried out in a separate graphitization furnace, such as an Acheson furnace or an LWG furnace, or in a continuous-mode graphitization furnace which is ideally located between the self-baking unit and the electrothermic reduction furnace.

The electrodes prepared in accordance with the present invention offer numerous advantages over the art. For electrothermic reduction furnaces, they are an economical alternative to high-temperature graphite electrodes for steel production and, at the same time, provide a high purity alternative to Söderberg electrodes. Further, they can be manufactured using several routes which are essentially based on existing manufacturing equipment.

The following examples are presented to further illustrate and explain the present invention and should not be viewed as limiting in any regard. Unless otherwise indicated, all parts and percentages are by weight, and are based on the weight of the product at the particular stage in processing indicated.

Example 1

85% anode coke having an average particle size of 6 mm and 15% coal-tar pitch were mixed in an intense mixer at 150° C. The mixture was then cooled and extruded to about 600 mm diameter×about 2400 mm long green electrodes. The green electrodes were processed as described above. The physical properties of these electrodes ($GE_{electrothermic}$) compared to those of graphite electrodes for steel production ($GE_{steel}$) as well as Söderberg electrodes are shown below.

| Electrode type | | $GE_{electrothermic}$ | $GE_{steel}$ | Söderberg |
|---|---|---|---|---|
| Bulk Density | (g/cm$^3$) | 1.62 | 1.75 | 1.38 |
| Open Porosity | (%) | 25 | 16 | 34 |
| Specific electrical resistivity | (μOhm m) | 11 | 4.5 | 29 |
| Thermal Conductivity | (W/m K) | 100 | 180 | 8 |
| Iron content | (%) | 0.05 | 0.2 | >1 |

Due to the lower graphitization temperatures, the graphite electrodes of this invention ($GE_{electrothermic}$) have a higher specific electrical resistivity and lower thermal conductivity compared to those of graphite electrodes for steel production ($GE_{steel}$). This renders them suitable with regard to the requirements of the electrothermic reduction furnaces having comparably low current densities. Besides the significant cost advantage, the graphite electrodes of this invention excel in their high purity specifically with respect to their iron content. The common Söderberg electrodes can cause contamination of the electrothermic melt, especially with iron. Furthermore, their relatively poor electrical as well as thermal conductivity, a compared to graphite electrodes, also has adverse effects on the energy consumption during smelting operations.

Example 2

80% anode coke having an average particle size of 6 mm and 20% coal-tar pitch were mixed in an intense mixer at 150° C., cooled, and extruded to about 330 mm diameter×about 2100 mm long green cylindrical bodies. The green cylindrical bodies were processed as the electrodes as described above. After graphitization, out of each cylindrical body 3 graphite pins were machined, having a double-conical shape with threaded surface to mate with the electrode threads. The physical properties of both, pins and corresponding electrodes, essentially matched each other. The assembled electrode column did not crack under thermal stress.

The above description is intended to enable the person skilled in the art to practice the invention. It is not intended to detail all of the possible variations and modifications that will become apparent to the skilled worker upon reading the description. It is intended, however, that all such modifications and variations be included within the scope of the invention that is defined by the following claims. The claims are intended to cover the indicated elements and steps in any arrangement or sequence that is effective to meet the objectives intended for the invention, unless the context specifically indicates the contrary.

I claim:

1. A method of producing an electrothermic melt, comprising the steps of:
    providing a graphite electrode including a shaped graphite electrode body formed from anode grade coke, graphitized at a graphitization temperature between 2200° C. and 2500° C. and having an iron content of less than 0.1% by weight; and
    operating the graphite electrode in an electrothermic reduction furnace to produce the electrothermic melt.

2. The method of claim 1, wherein the electrode body has a specific electrical resistivity of above 5 μOhm·m and a thermal conductivity of less than 150 W/m·K.

3. The method of claim 1, wherein the electrode body has an iron content of approximately 0.05% by weight.

4. The method of claim 1, wherein the operation of the graphite electrode produces at least one of aluminum, titanium, silicon, ferroalloys, and phosphorous.

5. The method of claim 1, wherein the graphite electrode further comprises amount of carbon nanofibers incorporated in the electrode body for increasing a mechanical strength and adjusting a coefficient of thermal expansion thereof.

6. The method of claim 1, wherein the graphite electrode further comprises an amount of carbon fibers incorporated in the electrode body for increasing a mechanical strength and adjusting a coefficient of thermal expansion thereof.

7. The method of claim 1, wherein the anode grade coke has a mean particle size of approximately 5 to approximately 10 mm.

8. The method of claim 7, wherein the mean particle size is between 5 and 7 mm.

9. The method of claim 1, wherein the graphite electrode is produced from an intermediate green electrode including particles of anode grade coke having a mean particle size of between 5 and 10 mm and an ash content of less than 0.5% mixed with a pitch binder, the intermediate green electrode being baked and graphitized to form the graphite electrode.

10. The method of claim 1, wherein the shaped graphite electrode body is mated with a graphite pin to form an electrode column, the graphite pin being formed of anode grade coke, graphitized at a graphitization temperature between 2200° C. and 2500° C., having an iron content of less than 0.1% by weight.

11. The method of claim 1, wherein the graphite electrode is disposed to form a central column of a self-baking composite electrode.

12. A method of producing a graphite electrode, which comprises:
    providing calcined anode coke with an average particle size of 5 to 10 mm and mixing the anode coke with a coal-tar pitch binder to form a mixture;
    forming an electrode body from the mixture to form a green electrode at a temperature in a vicinity of a softening point of the pitch binder;
    baking the green electrode at a temperature of between approximately 700° C. and approximately 1100° C., to carbonize the pitch binder to solid coke, to form a carbonized electrode;
    graphitizing the carbonized electrode with a heat treatment at a final temperature between 2200° C. and 2500° C. for a time sufficient to cause carbon atoms in the carbonized electrode to organize into a crystalline structure of graphite.

13. The method of claim 12, wherein the green electrode is baked at a temperature between 800° C. and 1000° C.

14. The method of 12, wherein the green electrode is baked in a relative absence of air at a heating rate of approximately 1 K to approximately 5 K per hour to the final temperature.

15. The method of claim 12, further including the steps of:
    after the baking step, impregnating the electrode at least one time with coal tar or petroleum pitch for depositing additional pitch coke in open pores of the electrode; and
    following each impregnating step with an additional baking step.

16. The method of claim 12, wherein the forming step includes adding oils or other lubricants into the mixture and forming the green electrode by extrusion.

17. The method of claim 12, wherein the forming step forms the green electrode by molding in a forming mold or by vibromolding in an agitated mold.

18. The method of claim 12, wherein the forming step includes adding a relatively low proportion of carbon fibers or carbon nanofibers into the mixture for forming the green electrode.

19. The method according to claim 12, further including the step of machining the graphitized electrode formed in the graphitizing step to provide a final form of the graphite electrode.

20. The method of claim 12, wherein the calcined anode coke provided in the providing step has an average particle size of 5 to 7 mm.

21. A method of producing a graphite electrode column, comprising the steps of:
    producing a plurality of graphitized electrodes according to the method of claim 12;
    producing a nipple configured to mesh with the plurality of graphitized electrodes; and
    connecting the plurality of graphitized electrodes and the nipple to form a graphite electrode column.

22. A method of producing an electrothermic melt, comprising the steps of:
    providing a graphite electrode produced in accordance with the method of claim 12; and
    operating the graphite electrode in an electrothermic reduction furnace to produce the electrothermic melt.

* * * * *